United States Patent [19]

Winski et al.

[11] Patent Number: 5,336,042
[45] Date of Patent: Aug. 9, 1994

[54] PALLETIZER WITH CAP FORMING

[75] Inventors: Ernest P. Winski, Oshkosh; Thomas L. Savoldi, Menasha, both of Wis.

[73] Assignee: Kinetic Robotics Inc., Menasha, Wis.

[21] Appl. No.: 847,581

[22] Filed: Mar. 5, 1992

[51] Int. Cl.⁵ .............................................. B65G 57/00
[52] U.S. Cl. ................................. 414/789.5; 414/791.6; 206/386; 493/418; 493/397; 493/964
[58] Field of Search ............. 414/789.5, 791.6; 206/386, 597, 821; 493/418, 397, 964; 53/157, 445, 399, 441, 556, 587, 588, 447, 540, 580, 397

[56] References Cited

U.S. PATENT DOCUMENTS

| | | | |
|---|---|---|---|
| 3,854,917 | 12/1974 | McKinney et al. | 493/418 X |
| 3,986,611 | 10/1976 | Dreher | 206/597 |
| 4,042,127 | 8/1977 | Brossia | 206/386 |
| 4,117,646 | 10/1978 | James et al. | 53/580 X |
| 4,295,568 | 10/1981 | Orpen | 206/597 |
| 4,400,929 | 8/1983 | Iwaki et al. | 53/580 |
| 4,458,467 | 7/1984 | Shulman et al. | 53/441 X |
| 4,551,126 | 11/1985 | Johnson et al. | 493/418 X |
| 4,756,143 | 7/1988 | Lancaster | 53/588 X |
| 4,978,275 | 12/1990 | Reid et al. | 414/789.5 |
| 5,045,044 | 9/1991 | McPherson et al. | 493/418 X |

FOREIGN PATENT DOCUMENTS

| | | |
|---|---|---|
| 956336 | 10/1974 | Canada . |
| 0296346 | 12/1988 | European Pat. Off. . |
| 2185461 | 7/1987 | United Kingdom . |
| 8002831 | 12/1980 | World Int. Prop. O. . |

*Primary Examiner*—Robert P. Olszewski
*Assistant Examiner*—Dean A. Reichard
*Attorney, Agent, or Firm*—Thomas D. Wilhelm

[57] ABSTRACT

Palletizing apparatus of the invention comprises a load forming station, a device for placing a layer on a pallet, devices for forming and placing a cap on the layer, and devices for applying restraint to formed edge panels of the cap. A formable cap sheet is received into the palletizing system as a flat sheet, and leaves the palletizing system as a formed cap on a load layer. The resulting pallet loads are preferably stretch wrapped. Methods of operating the apparatus are also disclosed.

29 Claims, 12 Drawing Sheets

PALLETIZER WITH CAP FORMING

BACKGROUND OF THE INVENTION

This invention relates to handling of materials in layers, and especially in layers on pallets and other supporting surfaces. It relates to palletizing materials with a minimum amount of manual lifting of product or other load materials by attending labor or machine operators. Individual elements of material being handled may be thin as a single sheet of paper, or thicker such as a magazine, a book, or a conventional carton of product. Particularly with reference to cartons and other boxes, the individual elements are sometimes susceptible to lateral displacement relative to each other in a layer, especially where there are gaps in rows, or between rows.

Individual layers on a pallet are typically separated by separating sheets, typically referred to as tie sheets. This invention is particularly concerned with the handling of separating sheets which are formed and used as 3-dimensional caps over each layer. Such a cap has a main panel covering the layer, and a plurality of edge panels depending downwardly from the main panel and engaging the sides of the respective layers. The cap is conventionally used to cover, in combination, a plurality of open-topped cartons which form a palletized layer of such cartons. Such cap is also used to cover an entire layer for the purpose of providing lateral stability to a palletized layer of unstable product such as e.g. a palletized layer of empty 2-liter polyethylene terephthalate soft drink bottles. Typically, the above caps are shipped to the user set up in 3-dimension format, and are placed on the pallet by hand labor. The use of hand labor for such repetitious task is wasteful of manpower. It is also wasteful to ship the caps set up if they can be shipped flat and automatically set up by the user in the palletizer.

Apparatus for automatically palletizing layers of material is known in the art. A conventional palletizer for boxes or cartons may use a horizontally, reciprocally movable transfer plate for carrying boxes to a position above a pallet onto which the boxes are to be loaded. The transfer plate is then withdrawn from beneath the boxes, thereby depositing them onto the pallet. Retaining means are used for preventing the boxes from moving with the transfer plate as it is withdrawn. Such retaining means commonly include a bar which abuts the side of the boxes facing the direction of transfer plate withdrawal. Structures of this general nature are disclosed in, for example, U.S. Pat. No. 3,149,732 Gagnon et al and U.S. Pat. No. 3,833,132 Alduk.

Palletizing and depalletizing apparatus are disclosed in the following U.S. Pat. Nos.

| Paxton et al | 2,243,919 |
| Samler | 2,656,047 |
| Locke | 2,875,907 |
| Woodcock | 2,875,908 |
| Keyes | 2,878,948 |
| Lazott et al | 2,937,482 |
| Reed | 2,940,617 |
| Freeman | 2,978,125 |
| Magnuson | 3,105,598 |
| Gagnon | 3,149,732 |
| McWilliams | 3,157,301 |
| Jeremiah | 3,166,203 |
| Kampert | 3,257,006 |
| Bruce | 3,278,048 |

-continued

| Roth et al | 3,389,810 |
| Grasvoll | 3,594,977 |
| Larson | 3,606,310 |
| Brockmuller | 3,637,093 |
| Grasvoll | 3,648,857 |
| Carlson | 3,669,282 |
| Von Gal Jr. et al | 3,682,338 |
| Munroe | 3,720,176 |
| Alduk | 3,833,132 |
| Dawson et al | 3,836,018 |
| Golantsev | 3,837,140 |
| Ballard | 3,884,368 |
| Beal | 3,946,883 |
| Wilde et al | 3,986,620 |
| Kelley | 4,030,618 |
| Mabey et al | 4,032,021 |
| Schmitt | 4,067,456 |
| Zimmerman | 4,159,058 |
| Schmitt | 4,162,016 |
| Shorthouse | 4,172,686 |
| Schmitt | 4,195,959 |
| Pantin | 4,205,934 |
| Faltin | 4,230,311 |
| Donnelly | 4,234,280 |
| Meratti | 4,255,074 |
| Pulda | 4,339,220 |
| Cox | 4,342,531 |
| Sylvander | 4,383,788 |
| Ishida et al | 4,397,246 |
| Werkheiser | 4,422,549 |
| Werkheiser | 4,439,084 |
| Wise | 4,477,067 |
| Feldkamper | 4,671,723 |
| Liebel | 4,708,247 |
| as well as | |
| Fed. Rep. of Germany | 3,107,495 |
| Japan | 54,129661 |

So far as is known to the inventors herein, none of the above references teach any apparatus or method adapted to automatically place a cap on a formed layer on a pallet. Neither does any reference teach apparatus or method for forming a cap as an integral part of the palletizing process.

It is an object of this invention to provide palletizing apparatus including means to automatically form and place caps on layers in the formation of pallet loads.

It is another object to provide apparatus and methods to preform the caps from flat sheets and to place the pre-formed caps on the respective layers of material.

It is yet another object to provide apparatus and methods to place the flat sheets, adapted to being formed into caps, on the layers, in the pallet load, and subsequently to form the flat sheets into layer caps in the pallet load.

It is still another object to provide apparatus and methods adapted to form the flat sheets into layer caps in the pallet load, and to hold each so-formed cap in its formed configuration until the formed configuration is secured by stretch wrapping.

SUMMARY OF THE DISCLOSURE

Some of these objects are attained in a palletizing apparatus adapted for placing a load of units of material on a pallet, and thereby creating a pallet load, with formed caps on the layers. The palletizing apparatus generally comprises a load forming station adapted to receive a pallet and to receive a layer of the units of material onto the pallet, the layer of units of material having a length and a width, and corresponding sides thereabout; means for placing a layer onto the pallet at the load forming station; means for forming and placing a cap on the layer in the load forming station, in a generally horizontal orientation, the cap entering the palletizer as a formable flat sheet, and departing the palletizer on a pallet load as a formed cap on a layer, the forming and placing means comprising (i) means for forming the flat sheet into a formed cap adapted to fit on a layer, the flat sheet comprising a main panel having a length and a width defining edges of the main panel, generally corresponding to the length and width and the corresponding sides of the layer, edge panels extending from the main panel at the edges, and operative lines of bending weakness between the edge panels and the main panel, and (ii) means for placing the cap on the layer; and means for applying restraint to edge panels of the cap and to thereby hold the restrained edge panels in predominantly vertical orientation and in substantial restraining contact with the corresponding sides of the layer.

In one adaptation of the invention, the means for forming and placing comprises (i) forming apparatus adapted to receive the formable flat sheet, and to fold the edge panels into a predominantly perpendicular orientation with respect to the main panel to thereby form the cap prior to the cap being placed on the layer, and (ii) placing apparatus adapted to place the so-formed cap on the layer.

In another adaptation of the invention, the means for forming and placing comprises (i) apparatus adapted to place the formable flat sheet on the layer in a generally horizontal orientation, with the edge panels of the flat sheet extending outwardly from the sides of the layer, and (ii) apparatus adapted to fold the edge panels of the flat sheet into a predominantly vertical orientation after the placing of the flat sheet on the layer.

In any of the adaptations and embodiments, the invention comprehends means for relieving bending stress in the formed cap, preferably by dispensing either steam or a water mist on the stressed areas of the formed cap.

Some objects of the invention are attained in a palletizing apparatus for placing a load of units of material on a pallet, and thereby creating a pallet load, with formed caps on the layers, the palletizing apparatus comprising a load forming station adapted to receive a pallet and to receive a layer of the units of material onto the pallet, the layer of units of material having a length and a width and corresponding sides thereabout; means for placing a layer of the units of material onto the pallet at the load forming station; means for placing a formable flat sheet on the layer in the load forming station, in a generally horizontal orientation, the flat sheet comprising a main panel having a length and a width defining edges of the main panel, generally corresponding to the length and width and the corresponding sides of the layer, edge panels extending from the main panel at its edges, and operative lines of bending weakness between the edge panels and the main panel; a cap forming station, including folding plows adapted to fold the edge panels of the flat sheets onto the sides of the layer and into a predominantly vertical orientation after the flat sheet has been placed on the layer; and means for applying restraint to edge panels of the so-formed cap to thereby hold the restrained edge panels in the predominantly vertical orientation and in substantial restraining contact with the corresponding sides of the layer.

In some adaptations of this embodiment, the means for applying restraint to the edge panels comprises a stretch wrapping station having apparatus adapted to stretch wrap the pallet load. The cap forming apparatus and the stretch wrapping apparatus (or other means for applying restraint to the edge panels of the formed cap) may be combined to form a single consolidation station of the palletizing apparatus for consolidating the load, where the edge panels of the cap are plowed into a vertical orientation by the folding plows and the pallet load is stretch wrapped after the edge panels are plowed. The consolidation station can include control means adapted to control withdrawal of the folding plows from the sides of the layer such that the folding plows hold the edge panels in place until the respective edge panels are stretch wrapped, and as the pallet load is stretch wrapped, portions of the folding plows are withdrawn from under the advancing stretch wrap material. Preferably, the portions of the folding plows under the advancing layers of stretch wrap material have one or more distal fingers thereof which are disposed close enough to the cap and the edges of the layer while the stretch wrap material is being applied, and which are appropriately configured, such that the distal fingers can be withdrawn from under the applied stretch wrap material without damaging either the stretch wrap material or the load. Further, the consolidation station preferably comprises support means supporting and mounting the folding plows, and including control means adapted to advance the plows simultaneously (i) vertically and (ii) inwardly toward the side edges of the layer at an angle displaced from the vertical, while folding the edge panels against the sides of the layer.

The consolidation station also preferably includes means for rotating the pallet load and the folding plows with respect to the stretch wrapping apparatus.

In another embodiment, the invention comprehends a palletizer comprising a load forming station adapted to receive a pallet and to receive a layer of the units of material onto the pallet; means for placing a layer of the units of material onto the pallet at the load forming station; and cap forming and placing apparatus comprising a lifting head and folding plows, the lifting head being adapted (i) to lift a formable flat sheet from a stack of such sheets and to pass the flat sheet through the folding plows to thereby fold the flat sheet into a formed cap having a main panel, with edges thereabout, and edge panels folded and depending from the edges, the formed cap being adapted to being placed over a layer of material on the pallet, and (ii) to place the so-formed cap on a layer of material on the pallet. This embodiment preferably includes a forming mandrel adapted to be placed on the opposite side of the flat sheet from the lifting head, and to push on the flat sheet opposite the lifting head as the flat sheet is passed through the folding plows and folded thereby.

The invention also comprehends methods of forming a pallet load, one method comprising the steps of placing a layer of units of material on a pallet in the load forming station, the layer having a length and a width and corresponding sides thereabout; forming and placing a cap on the layer in the load forming station, in a generally horizontal orientation, the cap entering the palletizer as a formable flat sheet, and departing the palletizer on the pallet load as a formed cap on the layer, the forming and placing comprising (i) forming the flat sheet into a cap adapted to fit on the layer on the pallet, the flat sheet comprising a main panel having a length and a width defining edges of the main panel, the length, width, and edges of the main panel generally corresponding to the length and width and the corresponding sides of the layer, edge panels extending from the main panel at the edges thereof, and operative lines of bending weakness between the edge panels and the main panel, and (ii) placing the cap on the layer; and applying restraint to ones of the edge panels of the cap and thereby holding the restrained edge panels in substantial restraining contact with the corresponding sides of the layer.

The method, in one embodiment, preferably includes folding the edge panels into a predominantly perpendicular orientation with respect to the main panel, thereby forming the flat sheet into a formed cap, and subsequently placing the formed cap on the layer.

In another embodiment, the method preferably includes (i) placing the flat sheet on the layer, with the edge panels of the flat sheet extending outwardly from the sides of the layer, and (ii) subsequently folding the edge panels of the flat sheet into a predominantly vertical orientation.

In still another embodiment, the method comprises the steps of placing a layer of units of material on a pallet in the load forming station, the layer having a length and a width and corresponding sides thereabout; placing a formable flat sheet on the layer in the load forming station in a generally horizontal orientation, the flat sheet comprising a main panel having a length and a width defining edges of the main panel, the length, width, and edges of the main panel generally corresponding to the length and width and the corresponding sides of the layer, edge panels extending from the main panel at the edges, and operative lines of bending weakness between the edge panels and the main panel; urging folding plows against the edge panels and thereby folding the edge panels of the flat sheet against the sides of the layer and into a predominantly vertical orientation after the placing of the flat sheet on the layer; and stretch wrapping the pallet load and thereby restraining the edge panels of the cap in substantial restraining contact with the corresponding sides of the layer.

In some adaptations of this embodiment, the step of folding the edge panels and the step of stretch wrapping are performed on the pallet load at a consolidation station adapted for both the folding step and the stretch wrapping step, and including controlling withdrawal of the folding plows from against the sides of the layer such that the folding plows hold the edge panels until the respective edge panels are stretch wrapped, and withdrawing the folding plows from under the advancing stretch wrap material as the stretch wrap material is advanced on the pallet load. The method preferably includes rotating the pallet load and the folding plows as a unit, with respect to the stretch wrapping apparatus during the stretch wrapping step.

The method of folding the edge panels onto the sides of the layer can include advancing the folding plows simultaneously (i) vertically and (ii) inwardly toward the sides of the layer, such that the plows advance toward the sides at an angle oblique to the vertical.

In still another embodiment, the invention comprehends a method of forming a pallet load, the method comprising the steps of placing a layer of units of material on a pallet in the load forming station, the layer having a length and a width and corresponding sides thereabout; forming a formable flat sheet into a cap by passing the flat sheet through folding plows to thereby form the flat sheet into a formed cap having a main panel, with edges thereabout, and edge panels folded and dependent therefrom, the formed cap being adapted to being placed over the layer of material on the pallet; and placing the so-formed cap on the layer of material. The method can include pushing on a surface of the flat sheet, opposite the lifting head as the flat sheet is passed through the folding plows and folded thereby.

In any of the above embodiments, a portion of the sheet may have been crushed, in preparation thereof, to thereby create a zone of reduced bending resistance, along a path generally defined by at least two adjacent edges of the main panel and extending transverse to the path a distance sufficient to allow forming of the flat sheet for emplacement, as a formed cap, on layers having, in combination, length and width variations of up to about 15%.

In any of the embodiments where the edge panels are not held by the folding plows as the stretch wrap is applied, the invention comprehends taping respective ones of the edge panels to each other at the corners of the formed cap after the forming of the cap from the flat sheet.

DETAILED DESCRIPTION OF THE ILLUSTRATED EMBODIMENTS

Figure 1:
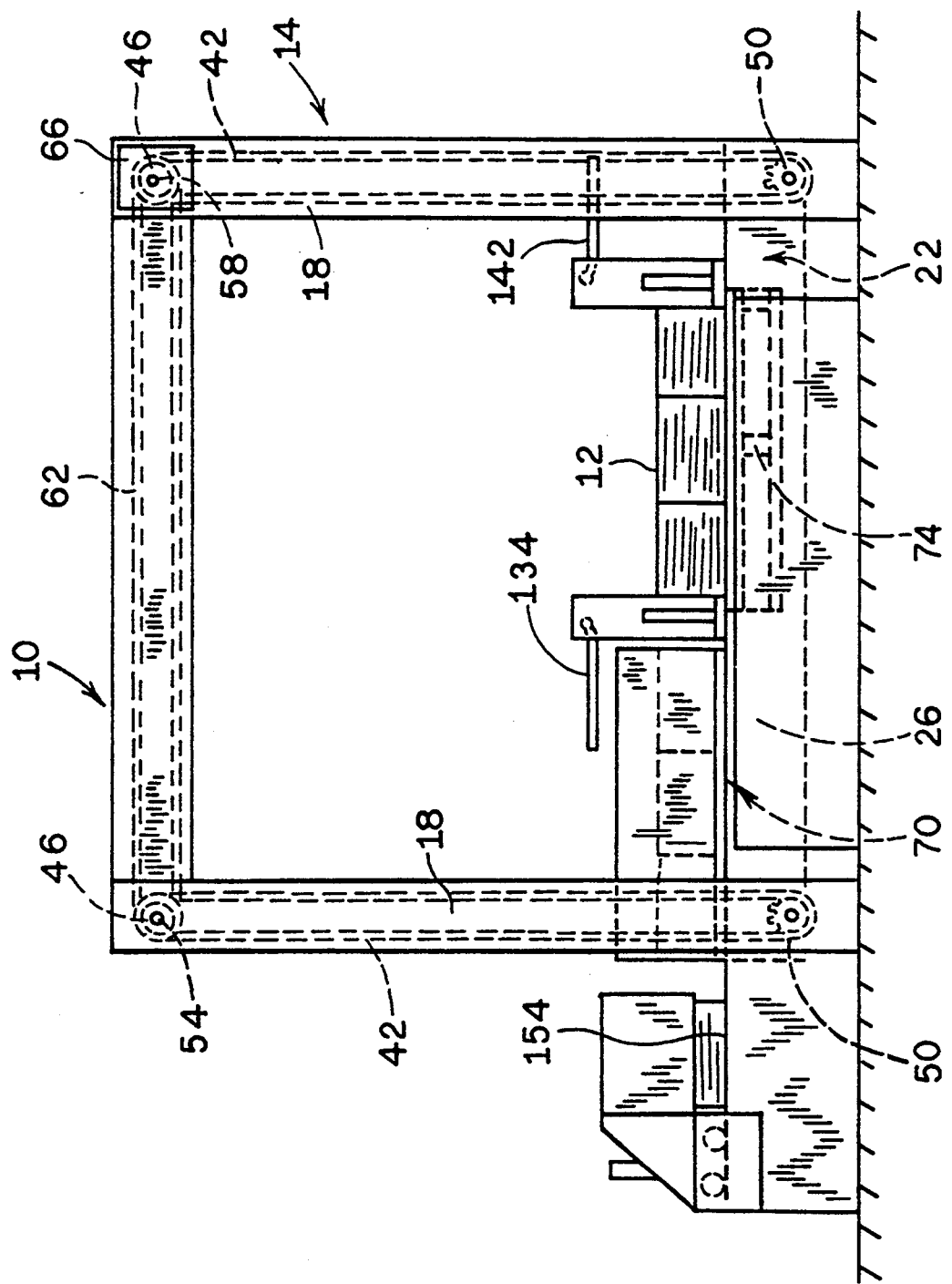
FIG. 1 shows a side elevation of a prior art palletizer.
Figure 2:
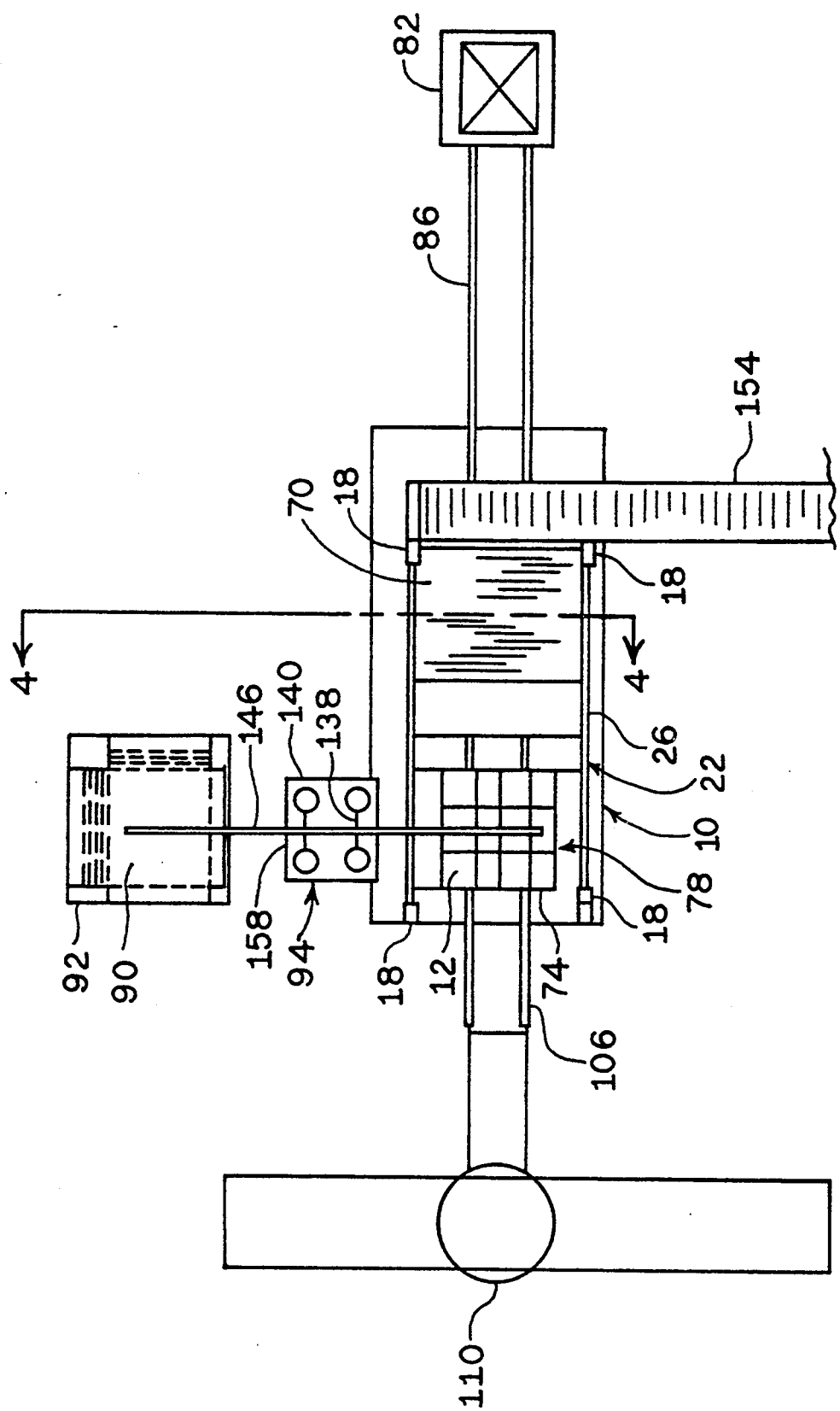
FIG. 2 is a top view of a first embodiment of the invention, showing relative locations of the elements.

A prior art palletizer 10 which can be adapted to be useful in the invention is illustrated in the drawings. The palletizer 10 is usable for depositing layers of material 12 onto a supporting surface such as a pallet or a previously deposited stack of material.

The palletizer 10 as generally disclosed herein comprises a frame 14 including four generally vertical members or posts 18 defining the corners of a rectangle. The palletizer 10 also comprises a generally rectangular, horizontally disposed carriage 22 having opposite first and second ends and four corners respectively connected to the four posts 18 of the frame 14 for vertical movement relative thereto. In the illustrated construction, the carriage 22 includes first and second generally parallel, horizontal, spaced apart side members 26, connected by a central connecting member. Each of the side members 26 has an E-shaped cross-section and defines upper and lower channels opening inwardly and having opposed upper and lower generally horizontal surfaces.

Means for reciprocally, vertically moving the carriage 22 relative to the frame 14 includes lift chains 42 on each of the frame posts 18, connected to the respective corners, for causing relative movement of the respective corners and the carriage 22. Each of the endless chains 42 is connected to the respective corner of the carriage 22. Each post 18 includes an upper drive sprocket 46 and a lower idler sprocket 50. Endless chains 42 are mounted around the sprockets 46 and 50. The upper sprockets 46 of the two left posts 18 (as viewed in FIG. 1) are connected by a drive shaft 54 and the upper sprockets 46 of the two right posts 18 (as viewed in FIG. 1) are connected by a drive shaft 58. Also the upper sprockets 46 of the two right posts 18 (as viewed in FIG. 1) are connected by an endless drive chain 62 to the upper sprockets 46 of the left posts 18 (as viewed in FIG. 1). Drive motor 66 is connected to the drive shaft 58 to drive the two right chains 42, and via the endless chain 62 and the drive shaft 54, the two left chains 42. Accordingly, the four endless chains 42 move in common, thereby causing common vertical movement of the four corners of the carriage 22.

A generally horizontal transfer plate 70 is mounted on the carriage 22 for reciprocal horizontal movement relative to the carriage 22 between a first layer depositing position wherein the transfer plate 70 is adjacent the load forming station of the palletizer and a second layer receiving position (as is FIG. 1) wherein the transfer plate 70 is adjacent the product in-feed conveyor 154. A pallet 74 is placed beneath the layer depositing position of the carriage 22 (as in FIG. 1) so that when the transfer plate 70 is in the layer depositing position it is above the pallet 74. The transfer plate 70 includes an upwardly facing surface adapted to carry the articles to be palletized.

Preferably the transfer plate 70 is mounted on carriage 22 by wheels rotatably mounted on the sides of the transfer plate 70 and received in the upper channels of the carriage side members 26 for rolling movement along the respective upper channels of the carriage side members.

The transfer plate 70 is moved between the first and second positions by endless chains on each of the side members of the carriage. The chains extend through the upper and lower channels of the side members, connect to the transfer plate 70, and are connected to a common drive means (not shown).

Means for stopping downward movement of the carriage 22 relative to the pallet or underlying load layer includes an electric eye and associated sensor mounted on carriage 22, and conventional control means for stopping downward movement of the carriage 22 when the circuit between the electric eye and the sensor is interrupted by the underlying load or pallet.

A first retaining plate 134 prevents the layer of material which is on transfer plate 70 from moving with the transfer plate 70 as the transfer plate 70 is withdrawn from the first position to the second position (from right to left as in FIG. 1) In the illustrated construction, the first retaining plate 134 is pivotally moveable between a raised position (FIG. 1) wherein the plate 134 is parallel to the transfer plate 70, and a lowered position (not shown) wherein the plate 134 is perpendicular to the transfer plate 70. A power cylinder (not shown) moves the plate 134 between the raised and lowered positions.

The carriage 22 typically includes a second retaining plate 142 similar to the first retaining plate 134 for retaining the layer of product when the transfer plate 70 is in the first or right position. A power cylinder (not shown) moves the retaining plate 142 between its raised (FIG. 1) position and its lowered position.

Product in-feed conveyor 154 extends generally perpendicular to the direction of movement of the transfer plate 70, and is disposed adjacent the left end of carriage 22.

The conventional portions of the palletizer, generally described above, receive e.g. product to be palletized, form it into layers, and place one or more of the formed layers onto a pallet. The construction and operation of the apparatus which forms the layers of product and places the layers on the pallet is well illustrated in U.S. Pat. No. 4,704,060 issued to Winski et al, and is herein incorporated by reference for its teaching of palletizing apparatus and methods.

Figure 14:
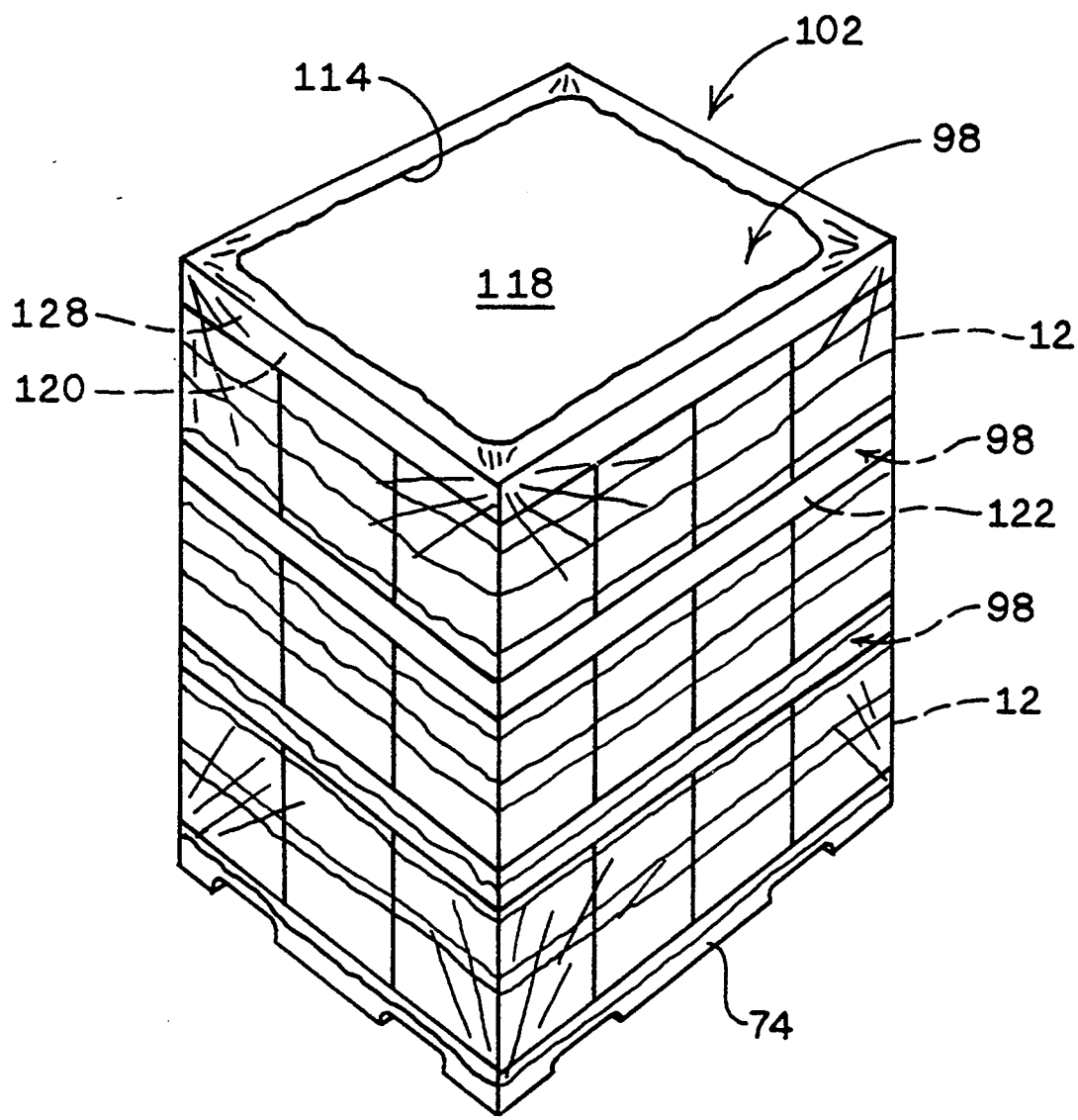
FIG. 14 shows a pallet load as formed and stretch wrapped according to this invention.

FIGS. 2-5 illustrate a first embodiment of the invention, parts of which are common to all of the illustrated embodiments. The palletizing system as seen in plan view in FIG. 2 comprises the improved palletizer of the invention. The palletizer 10 in FIG. 2 includes product in-feed conveyor 154, transfer plate 70, and load forming station 78 having a pallet 74 therein and a layer of material 12 thereon. Pallet dispenser 82 and pallet in-feed conveyor 86 provide pallets 74 as needed to the load forming station 78. A stack 88 of cap sheets 90 configured flat in a carton 92 is positioned adjacent a cap former 94 which is adapted to pre-form the flat sheets 90 into 3-dimensional caps 98 and to place the pre-formed caps 98 on layers of material 12 in the pallet load 102. After the building of the pallet load 102 has been completed, including placing caps on the layers, exit conveyor 106 transports the pallet load to stretch wrap apparatus 110 where the load is stretch wrapped, thus applying a containing restraint to both the layers of material and the caps 98 on the layers. The restraint of the stretch wrap specifically urges the edge panels 120, 122, 124, and 126 against the respective sides of the respective layers. FIG. 14 generally depicts the pallet load 102 with the caps 98 on each layer, and stretch wrapped with stretch wrap film 114.

Figure 3:
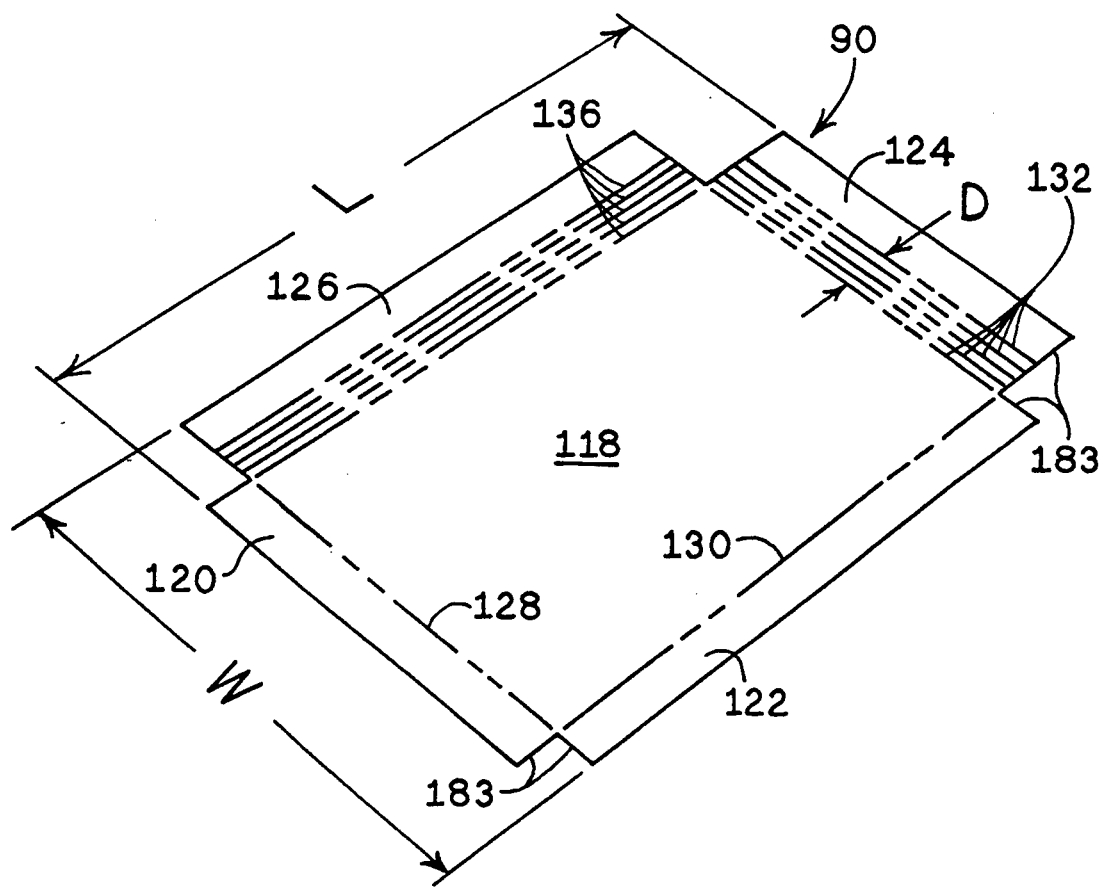
FIG. 3 shows a flat cap sheet which, in this invention, is formed and placed on load layers as a layer cover.

FIG. 3 shows a flat cap sheet 90 in more detail. Sheet 90 is typically made of 3-ply corrugated box board. Paperboard carton stock is also contemplated for use. The sheet 90 has a main panel 118 and edge panels 120, 122, 124, 126. Edge panels 120 and 122 are each connected to main panel 118 by a single score line 128, 130. Edge panels 124 and 126 are each connected to main panel 118 by multiple score lines 132, 136. The purpose of the multiple score lines 132, 136 is to permit the flat cap sheet 90 to be used to form caps having a variety of lengths "L" and widths "W," by adjusting the length and width between the folding plows, and thus folding the edge panels 124, 126 at the appropriate ones of score lines 132, 136.

Any of the score lines are representative of any line of weakness, however formed. Other methods of forming lines of weakness include cuts partially through the thickness of the material, perforations, and crushing. All such methods, including crushing, can be practiced along a width dimension extending transverse to the edge of the main panel 118. Such a width dimension is represented by the dimension "D" extending between the outer-most ones of multiple score lines 132 in FIG. 3. Multiple lines of shallow cuts or of perforations could be arranged similarly. Dimension "D" could also be uniformly pre-crushed along the length of the edge of panel 118 whereby the edge panel 124 could be bent along any locus so weakened.

Figure 4:
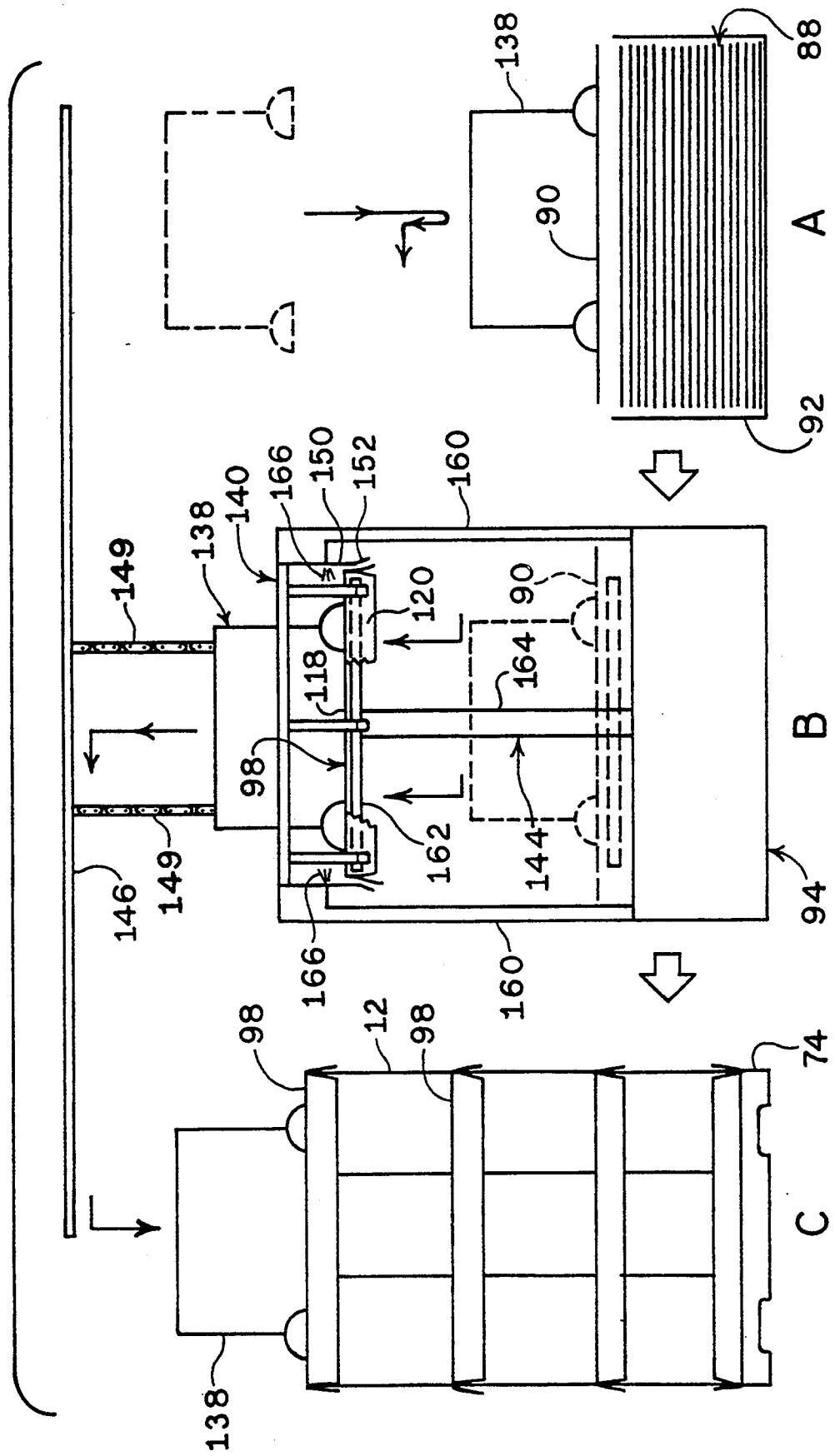
FIG. 4 is a partial side elevation, taken at 4—4 of FIG. 2, showing the progressive forming and placing of the cap.

FIG. 4 shows the cap forming and placing operation. Station A shows the stack 88 of flat sheets 90. Station B shows forming of the flat sheet into a cap 98. Station C shows placing the formed cap on a layer of the load. Station C corresponds in location to load forming station 78 in FIG. 2, whereby the pallet 74 at Station C in FIG. 4 is the same pallet 74 as in FIG. 2. The cap former 94 comprises a pick-up assembly 138, a folding plow assembly 140, and forming mandrel 144.

Pick-up assembly 138 generally comprises an overhead support frame 146, and a suction cup assembly 148, suspended from the support frame 146 by a drive train comprising a plurality of chains 149 driven by a drive motor (not shown). The nature of pick-up assembly 138 is more fully described in U.S. Pat. No. 4,988,264, issued to Winski, at column 10 lines 27–42, herein incorporated by reference. Winski '264 shows two operating stations for the pick-up assembly. Those skilled in the art will readily make the mechanical adjustments to the pick-up assembly of Winski '264 in order to adapt it to operate at three stations as in the instant FIG. 4.

The pick-up assembly 138 is shown in each of Stations A, B and C, in FIG. 4 to illustrate its various positions of operation. It should be understood that only one pick-up assembly 138 is being disclosed, and that its location will change during operation thereof as illustrated.

Figure 5:
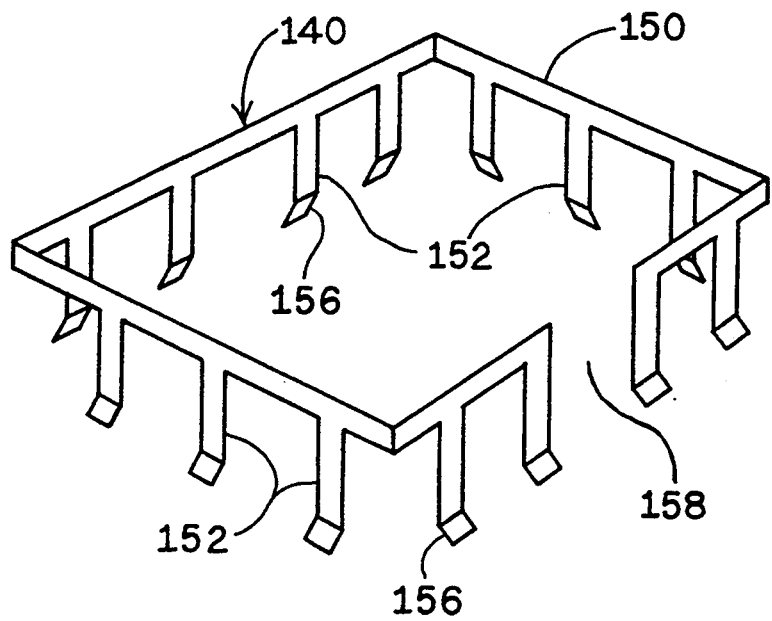
FIG. 5 is a pictorial view of a folding plow assembly used in FIG. 4 in forming the flat sheet into a cap.

Folding plow assembly 140 is seen in elevation at Station B in FIG. 4, and is also seen in pictorial view in FIG. 5. Folding plow assembly 140 generally comprises an upper frame member 150 and a plurality of plowing fingers 152 depending therefrom. Fingers 152 terminate in outwardly angled tips 156. Upper frame member 150 has a gap 158 therein for lateral entry of suspension chains 149 of suction cup assembly 148 as will be explained hereinafter. Folding plow assembly 140 is mounted in cap former 94 by supports 160.

Mandrel 144 generally comprises a platen 162 mounted on an extendable piston 164. The platen 162 is generally shaped as a flat plate having length and width extending snugly within the inside length and width of the folding plow assembly 140 when pushing a cap sheet 90 through the folding plow assembly to form the flat sheet into a 3-dimensional cap.

The cap forming station 94 can be adapted to form the flat sheets into caps having any of a variety of length and width dimensions by mounting a properly-sized combination of folding plow assembly 140 and platen 162. Alternatively, the upper frame member 150 can be made laterally adjustable, as on two sides, to correspond with ones of the multiple score lines 132, 136 on the corresponding two sides of sheets 90, whereupon only the platen 162 need be replaced to change cap sizes.

The platen 162 can be extended upwardly through folding plow assembly 140, and retracted downwardly as shown at Station B in order to provide clearance for lateral movement of the pick-up assembly 138 from Station A to Station B.

The cap forming and placing operation illustrated in FIGS. 2–5 operates generally as follows. Pick-up assembly 138 generally starts its cycle at the raised position shown in dashed outline at Station A. From the raised position, pick-up assembly 138 is lowered onto the stack 88 of flat sheets 90 and picks up the top sheet by activating the suction cups, thus temporarily securing the top sheet 90 to the pick-up assembly. When the picked-up sheet 90 is raised above the top of the carton 92 as shown in solid outline of the pick-up assembly at Station A, the pick-up assembly moves laterally with the sheet 90 to Station B, at the lower position shown in dashed outline in Station B. Forming mandrel 144, comprising platen 162 and piston 164, has previously been withdrawn downwardly as shown in dashed outline at Station B. As the pick-up assembly 138 moves laterally from Station A to Station B, the suction cup assembly 148 is below the folding plow assembly 140. The drive chains 149 which extend downwardly from the overhead support frame 146 to thereby support the suction cup assembly, enter the folding plow assembly 140 through gap 158, gap 158 being disposed toward Station A.

Forming mandrel 144 and pick-up assembly 138 then move upwardly together with sheet 90 held between them. As the sheet 90 reaches the stationary folding plow assembly 140, edge panels 120, 122, 124, 126 engage plow fingers 152, initially at finger tips 156. Platen 162, having length and width generally corresponding to a set of score lines about the perimeter of main panel 118 of the cap sheet 90 continues to push upwardly on main panel 118 such that the edge panels are folded about the respective score lines with respect to main panel 118 as shown at Station B. As the edge panels are folded, the folding process creates folding stress in the sheet. The folding stress urges the folded panels to spring back toward the pre-folding flat sheet shape. A mist spray of water or steam is preferably applied to the edges of the main panel 118 adjacent the respective stressed score lines by nozzles 166 mounted on the folding plows as shown at Station B, to relieve the bending stress. Accordingly, the spring-back is controlled such that the formed shape of the cap is generally maintained as illustrated at Station C.

As the now-formed cap 98 finishes its traverse upwardly through the folding plow assembly, forming mandrel 144 is withdrawn to its lowered (dashed outline) position. The cap is held above the folding plow assembly by pick-up assembly 138. The pick-up assembly then moves laterally, with cap 98, to Station C and lowers the cap 98 downwardly onto the layer on the pallet, as shown in Station C. Pick-up assembly 138 then releases its temporary securement to cap 98, onto the layer and returns in a generally lateral movement to the upper location shown in dashed outline at Station A. The above sequence is repeated for each layer on the pallet that receives a cap. Preferably, a cap is preformed for each layer while the respective layer is being formed in the palletizer. Accordingly, the cap can be placed on the layer as soon as the layer is deposited on the load.

FIGS. 6–9 illustrate a second embodiment of the invention wherein components common with the first embodiment have like numbers. The second embodiment has palletizer 10 with layer of material 12 on a pallet 74 in load forming station 78. The palletizer is supported by four posts 18 which carry carriage 22 and its side members 26. Transfer plate 70 receives units of material from in-feed conveyor 154 and deposits the material in layers on a pallet load 102 at the load forming station 78. Pallet dispenser 82 and pallet in-feed conveyor 86 supply pallets to the load forming station to be loaded with product. A stack 88 of flat cap sheets 90 in a carton 92 is positioned adjacent the load forming station 78. Exit conveyor 106 transports the pallet loads to the cap forming station 168. Conveyor 170 subsequently transports the pallet loads to stretch wrapper 110.

Pick-up assembly 138 generally comprises overhead support frame 146 and suction cup assembly 148. Note that, in this embodiment, there is no cap former (94 at Station B, FIG. 4) to pre-form the sheets 90 into caps. Rather, the pick-up assembly 138 picks up the flat sheets 90 from stack 88, and places them on the respective layers as flat sheets. When all the desired layers have been placed on the load, and cap sheets 90 have been placed on the respective layers, the load is transferred to cap forming station 168.

Figure 7:
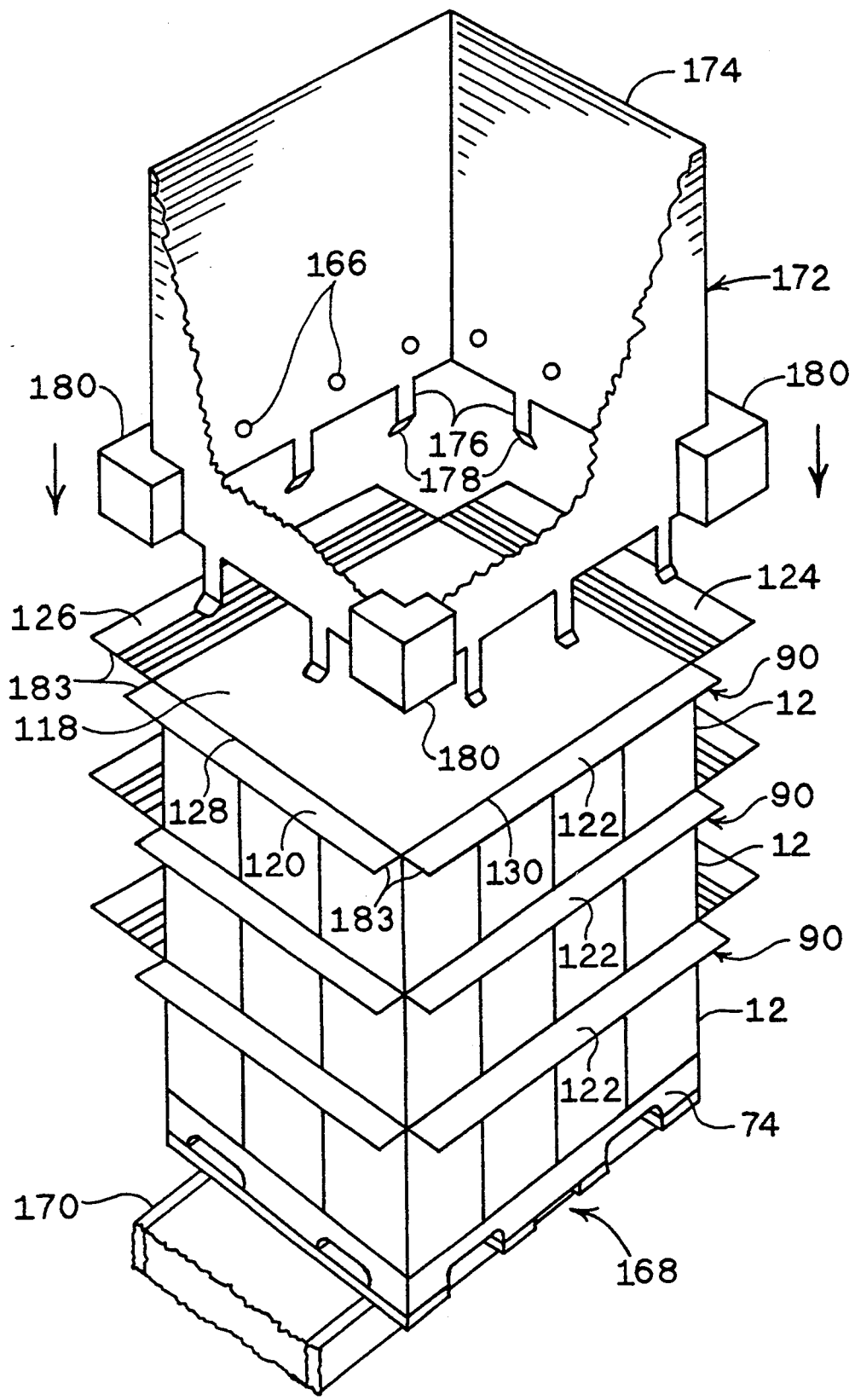
FIG. 7 is a pictorial view of the cap forming station of FIG. 6 with the folding plow assembly in the raised position, prior to folding the edge panels down.

At cap forming station 168, folding plow assembly 172 generally comprises an upper frame member 174 and a plurality of plowing fingers 176 depending therefrom. As shown in FIG. 7, the vertical dimension "D" of the combination of upper frame member 174 and fingers 176 is greater than the height "H" of a layer. Fingers 176 terminate in outwardly angled tips 178. Tape dispensers 180 are mounted to the plow assembly at each of its four corners. Suitable tape dispensers 180 are available from, for example, Minnesota Mining and Manufacturing Company, St. Paul, Minn. Folding plow assembly 172 is supported and driven by conventional support and drive means (not shown).

The pallet load 102, having been loaded at load forming station 78 with a plurality of layers of material 12, and a flat cap sheet 90 on each layer, arrives at cap forming station 168 as shown in FIG. 7 and is indexed, by appropriate drivers and positioning switches, directly under folding plow assembly 172. Folding plow assembly 172 comes down around the pallet load 102 as shown by the arrows in FIG. 7, folding the edge panels 120, 122, 124, and 126 about score lines 128, 130, 132, and 136, respectively, and applying tape 182 between the respective ends 183 of the adjacent edge panels. Steam or mist can be applied as desired by nozzles 166. Plow assembly 172 then returns to its upper position (FIG. 7). The pallet load, with its plowed and taped caps 98, is transported by conveyor 170 to stretch wrap station 110 where it is stretch wrapped. An enlarged view of the cap, as plowed and taped in FIG. 8, is illustrated in FIG. 9.

Figure 9:
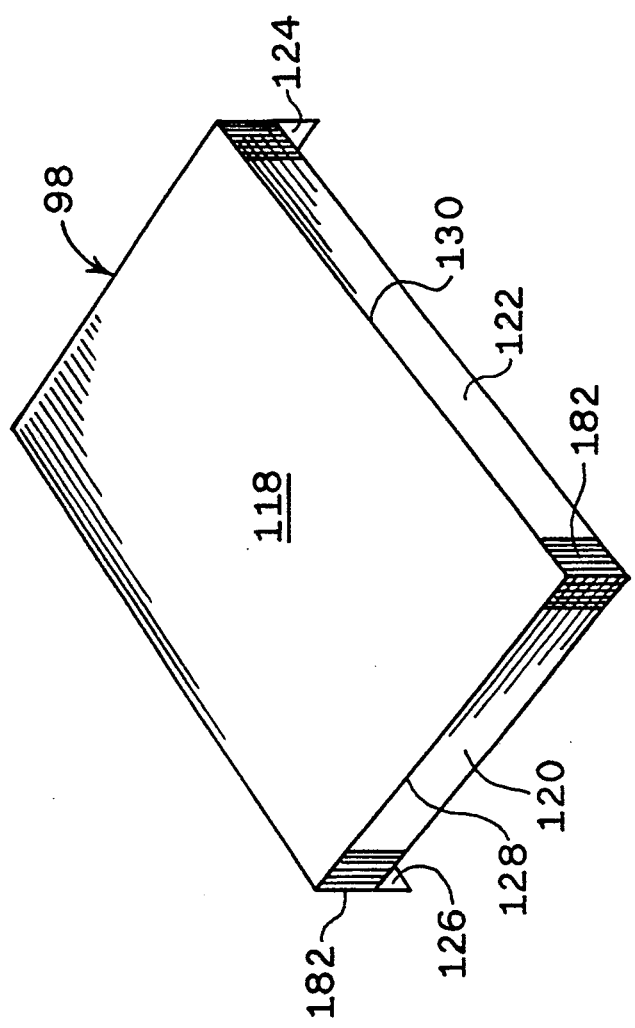
FIG. 9 is a pictorial view of a formed cap, with edge panels taped.
Figure 10:
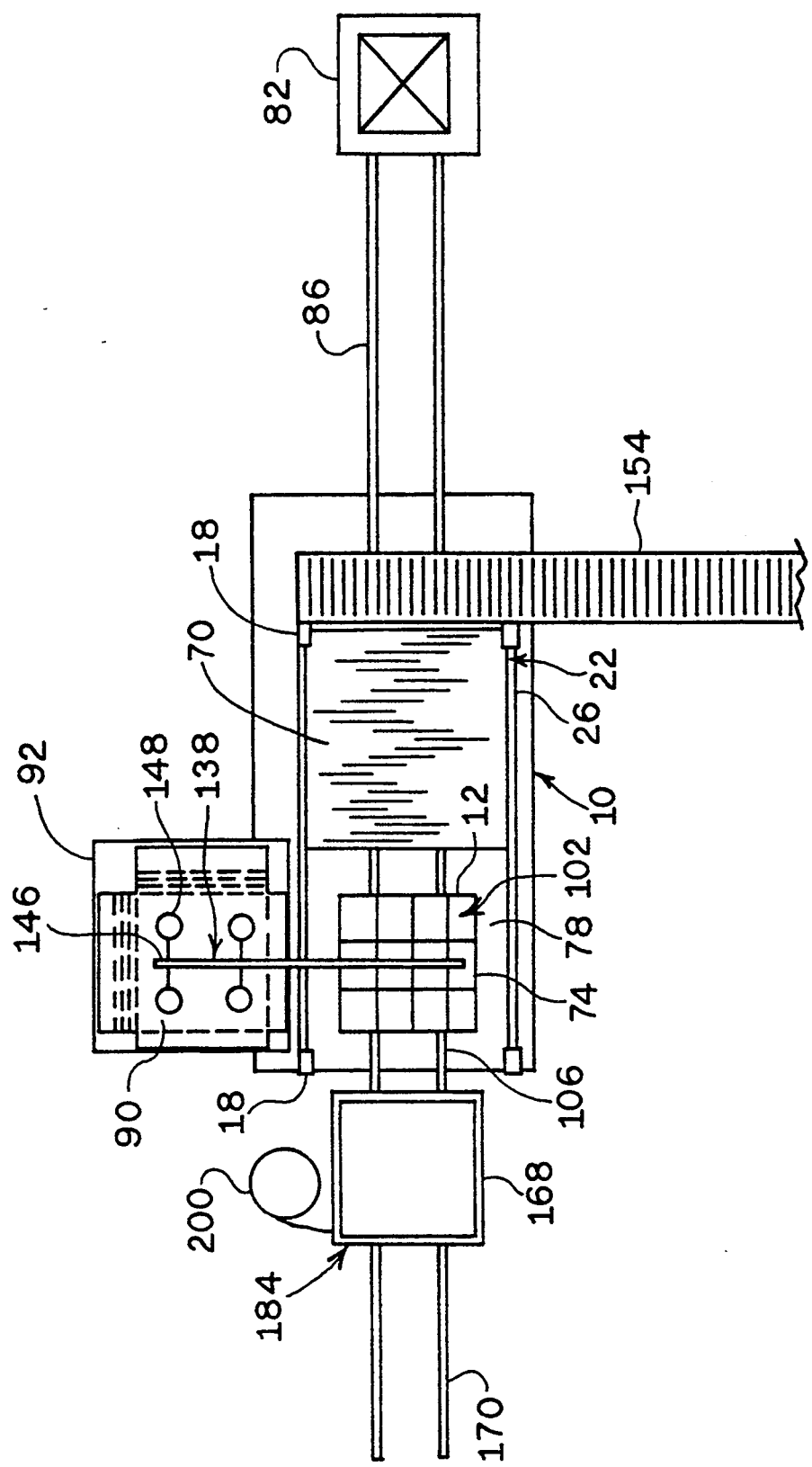
FIG. 10 is a top view of a third embodiment of the invention, showing relative locations of the elements.
Figure 11:
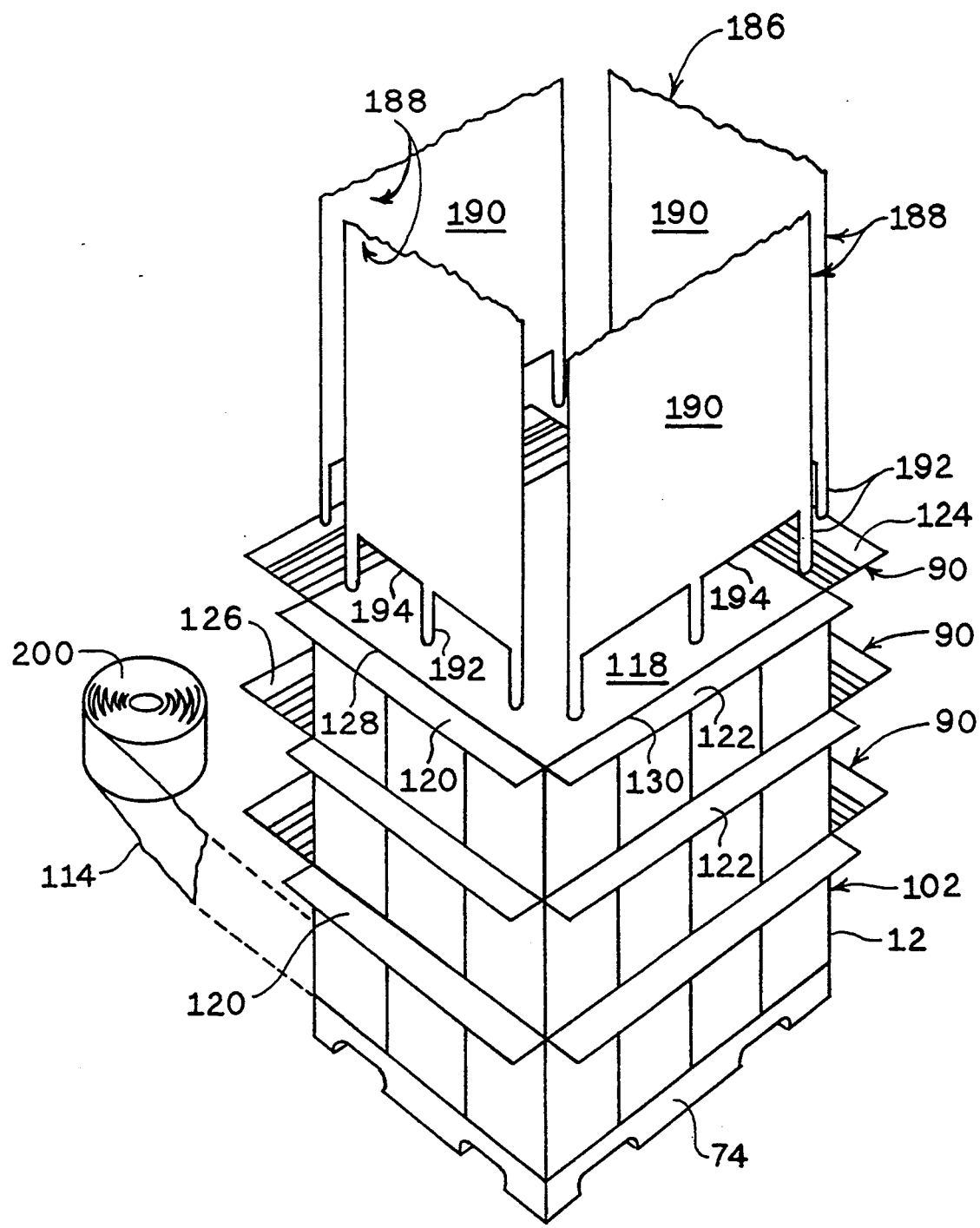
FIG. 11 is a pictorial view, with parts cut away, of the consolidation station of FIG. 10, with the folding plow assembly in the raised position, prior to folding the edge panels down.
Figure 12:
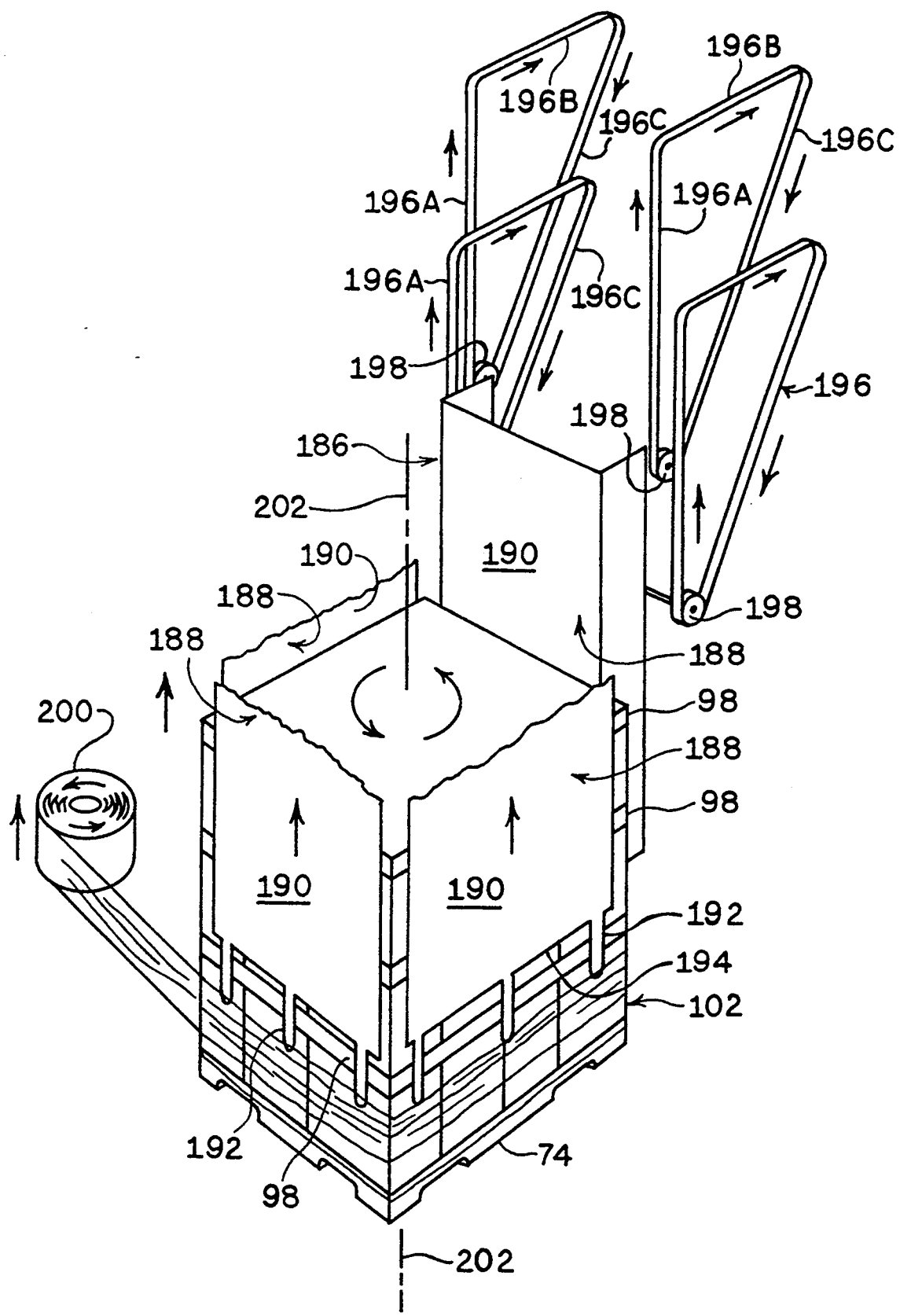
FIG. 12 is a pictorial view, with parts cut away and parts shown in part, of the consolidation station of FIGURE 11, with the folding plow assembly in the down position, and the caps formed, with the plow assembly holding the edge panels down while stretch wrap material is applied.

FIGS. 10–12 illustrate a third embodiment of the invention wherein components common with the first or second embodiments have like numbers. In the third embodiment, the apparatus, methods and supplies are the same as in the second embodiment (FIGS. 6–9) except for cap forming station 168 and stretch wrap station 110. Accordingly, the description of the like apparatus and its operation are not repeated here. Rather, only the major, and distinguishing differences are discussed here.

Figure 6:
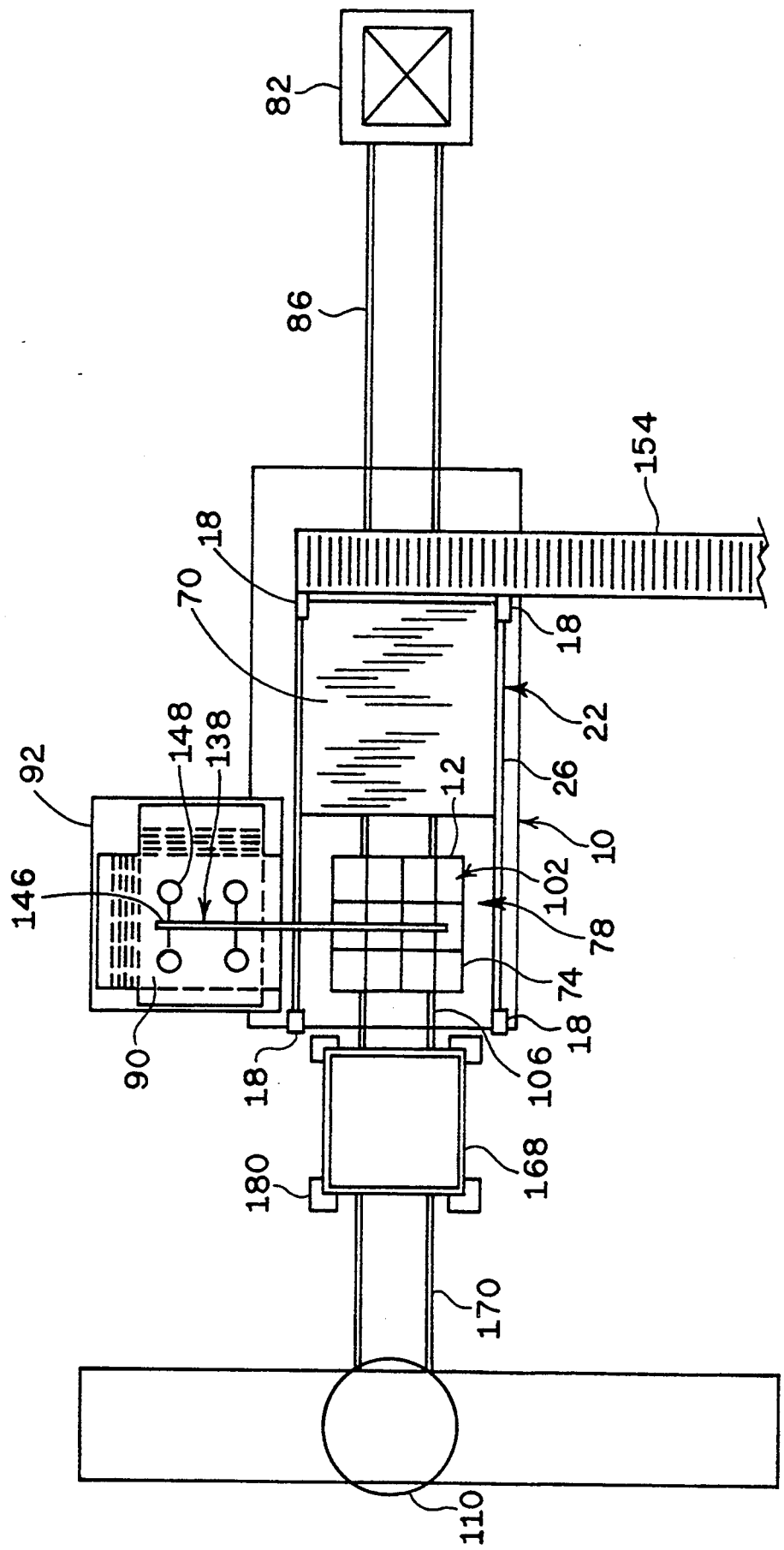
FIG. 6 is a top view of a second embodiment of the invention, showing relative locations of the elements.

Comparing, first, plan view FIG. 10 of the third embodiment with plan view FIG. 6 of the second embodiment, it is seen that the stretch wrap apparatus 110 has been moved, in FIG. 10; directly adjacent cap forming station 168, such that cap forming and stretch wrapping can both be accomplished at a combined "consolidation" station 184. The capped and wrapped pallet load is discharged from consolidation station 184 on conveyor 170 for shipment.

Figure 8:
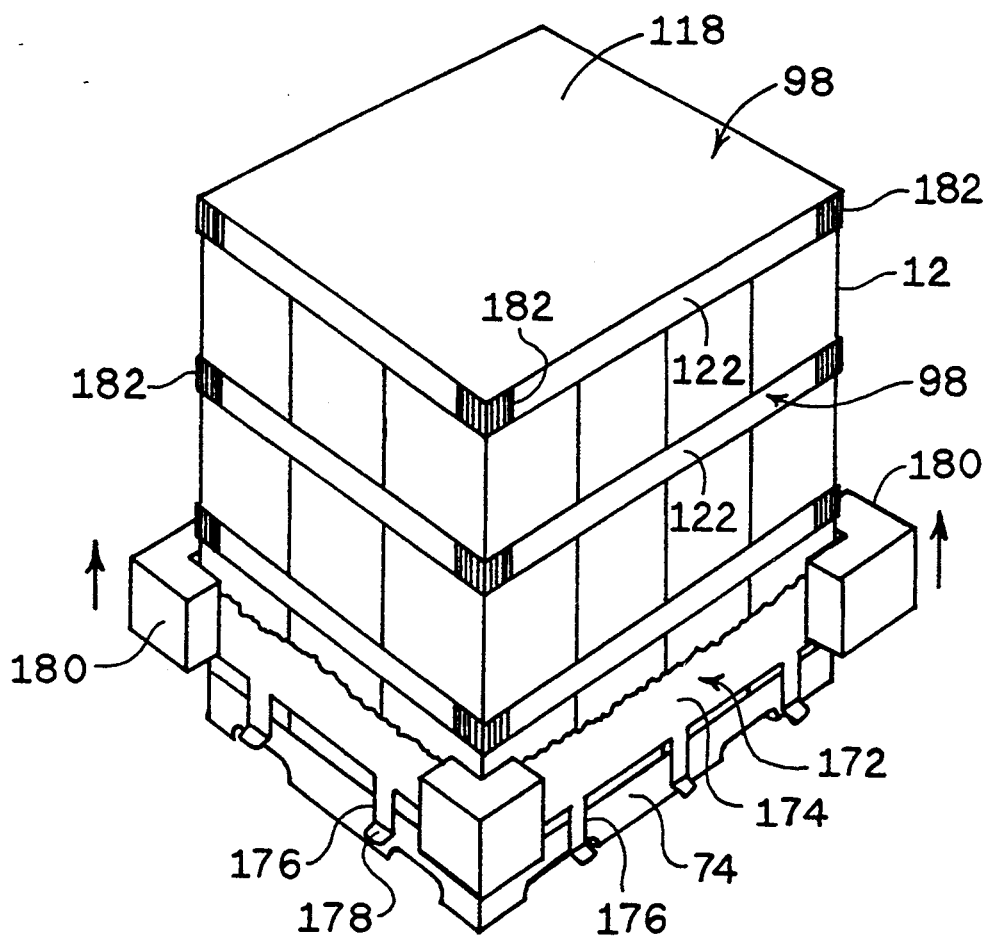
FIG. 8 is a pictorial view as in FIG. 7, showing the folding plow assembly down and the caps formed, whereby the edge panels are folded down and taped.
Figure 13:
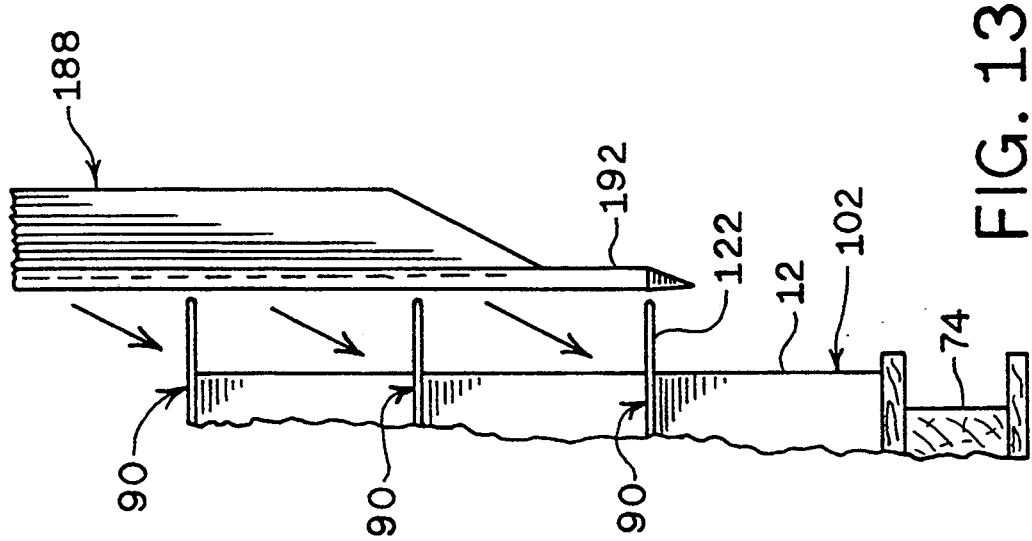
FIG. 13 is a fragmentary side view showing the direction of action of a folding plow panel on the edge panels of the cap sheets.

The folding plow assembly 186 as illustrated in FIGURES 10–12 differs significantly from the folding plow assembly of FIGS. 6–8, both in structure and function, though its purpose, of plowing down the edge panels to form the caps, is the same. As seen in especially FIGS. 11 and 12, plow assembly 186 generally comprises a plow panel 188 above and adjacent each of the four sides of the pallet load. Each plow panel 188 comprises a plow plate 190 and a plurality of plow fingers 192 extending downwardly from the lower edge 194 of the plow plate 190. The plow plates in FIG. 11, and three of the plow plates in FIG. 12 are shown cut away for simplicity of the illustration. One of the plow plates is shown in full in FIG. 12. As seen in FIG. 12, each plow plate 190 is mounted on a set of tracks 196 by a plurality of wheels 198. Each wheel track 196 has a vertical section 196A, a horizontal section 196B, and a diagonal, or oblique, section 196C. Conventional raising and lowering apparatus (not shown) moves the plow plates, in unison, along the paths defined by the respective tracks. As shown in FIG. 12 for one set of tracks 196, each set of tracks guides its respective plow plate along a circuitous path that follows the arrows as shown along the tracks 196. Namely, starting from the position of the plows shown in FIG. 12, tracks 196 guide the movements of plow plates 190 in a vertical upwardly direction along track sections 196A until wheels 198 encounter track sections 196B; whereupon track sections 196B direct subsequent movement of the plow plates outwardly, away from the pallet load; and thence downwardly and inwardly, toward a pallet load along track section 196C. Plow plates 188 as shown in FIG. 11 have been fully retracted upwardly and are positioned such that their mounting wheels 198 are located at the joinder of track sections 196A and 196B. To get from the position shown in FIG. 11 to the position shown in FIG. 12, the plow plates travel outwardly along track sections 196B and thence downwardly at a diagonal, or oblique, angle along track sections 196C. As the plow plates travel diagonally downwardly toward the pallet load, the plow plates engage the edge panels 120, 122, 124, and 126 of the cap sheets and bend them downwardly about the respective score lines and into substantial engagement with the sides of their respective layers, as shown in FIGS. 12 and 13. The diagonal direction of motion of any given plow plate 190 is illustrated in FIG. 13.

With the plow plates at their lower-most position as shown in FIG. 12, and with plow fingers 192 holding down the edge panels of the lower-most cap sheet 90, the stretch wrapping apparatus, represented in FIGS. 11 and 12 by a roll 200 of stretch wrap film 114 is engaged. As shown by the rotational arrows at the top of the pallet load in FIG. 12, the pallet load 102 and plow assembly 186 preferably rotate about a vertical axis 202, pulling stretch wrapping film off the roll and beginning the wrapping of the pallet load. As the load turns, the roll of film is gradually raised in the conventional manner to bring the film progressively higher on the load.

As the film 114 wraps the edge panels of the lower-most cap 98 (now formed from its sheet 90 by plow plates 190) and extends a portion of the advancing film over plow fingers 192, the folding plow assembly 186 begins to be raised at the same rate as the roll 200 of film 114. The film and plow assembly are thus raised together until the load is wrapped to its full height as shown in FIG. 14, and the plow plates and fingers are fully withdrawn from the sides of the load. Thus fingers 192 hold the respective edge panels of the caps 98 against the respective sides of the respective layers until the respective edge panels are secured in place by the stretch wrap film. Accordingly, the load is consolidated by a combination of plowing, holding, withdrawing, and stretch wrapping. The so-consolidated load is transported along conveyor 170 to a pick-up location (not shown) for shipping.

Referring to FIG. 12, in an alternate arrangement, pallet load 102 and plow assembly 186 do not rotate. Rather, the roll of stretch wrap film, and its associated support apparatus, revolves around the pallet load, dispensing and wrapping the film.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. Palletizing apparatus for placing a load of material on a pallet in one or more layers, and thereby creating a pallet load, with a formed cap on at least one such layer, said palletizing apparatus comprising:
   (a) a load forming station, for receiving a pallet and for receiving material onto the pallet in a layer, wherein such material has a length and a width, and corresponding sides thereabout;
   (b) transfer apparatus for placing material onto the pallet at said load forming station;
   (c) forming and placing apparatus for forming a cap and pacing such cap on such material in said load forming station, such cap entering said palletizing apparatus as a formable flat sheet, and departing said palletizing apparatus on a pallet load as a formed cap on such material, said forming and placing apparatus comprising
      (i) a former for forming the flat sheet into a formed cap, such flat sheet comprising a main panel having a length and a width defining edges of the main panel, generally corresponding to the length and width and the corresponding sides of the material, edge panels extending from the main panel at the edges, and operative lines of bending weakness between the edge panels and the main panel, and
      (ii) placing apparatus for placing the cap on such material,
   said placing apparatus being adapted to place a first such formable flat sheet on a first layer of material in a generally horizontal orientation, with the edges panels of the flat sheet extending outwardly from the sides of the layer, and to place a second such formable flat sheet on a second layer of material, the second layer overlying the first formable flat sheet, and
   said former being adapted for folding edge panels of the first flat sheet, and for folding edge panels of the second flat sheet while holding edge panels of the first sheet so folded.

2. Palletizing apparatus as in claim 1 and including spray nozzles for spraying water mist to relive bending stress in the formed cap.

3. Palletizing apparatus for placing a load of material on a pallet in one or more layers, and thereby creating a pallet load, with a formed cap on at least one such layer, said palletizing apparatus comprising:
   (a) a load forming station, for receiving a pallet and for receiving material onto the pallet in a layer, wherein such material has a length and a width, and corresponding sides thereabout;
   (b) transfer apparatus for placing material onto the pallet at said load forming station;
   (c) forming and placing apparatus for forming a cap and placing such cap on such material in said load forming station, such cap entering said palletizing apparatus as a formable flat sheet, and departing said palletizing apparatus on a pallet load as a formed cap on such material, and forming and placing apparatus comprising
      (i) a former for forming the flat sheet into a formed cap, such flat sheet comprising a main panel having a length and a width defining edges of the main panel, generally corresponding to the length and width and the corresponding sides of the material, edge panels extending from the main panel at the edges, and operative lines of bending weakness between the edge panels and the main panel, and
      (ii) placing apparatus for placing the cap on such material; and
   (d) spray nozzles for spraying water mist to relieve bending stress in the formed cap.

4. Palletizing apparatus for placing a load of material on a pallet in one or more layers, and thereby creating a pallet load, with a formed cap on at least one such layer, said palletizing apparatus comprising:
   (a) a load forming station, for receiving a pallet and for receiving material onto the pallet in a layer, wherein such material has a length and a width, and corresponding sides thereabout;
   (b) transfer apparatus for placing material onto the pallet at said load forming station;
   (c) forming and placing apparatus for forming a cap and placing such cap on such material in said load forming station, such cap entering said palletizing apparatus as a formable flat sheet, and departing said palletizing apparatus on a pallet load as a formed cap on such material, said forming and placing apparatus comprising
      (i) a former for forming the flat sheet into a formed cap, such flat sheet comprising a main panel having a length and a width defining edges of the main panel, generally corresponding to the length and width and the corresponding sides of the material, edge panels extending from the main panel at the edges, and lines of binding weakness between the edge panels and the main panel, and
      (ii) placing apparatus for placing the cap on such material, said forming and placing apparatus comprising a former adapted to fold the edge panels to thereby form the cap at a cap forming station, and placing apparatus adapted to place the so-formed cap on the material at a work station, separate from said cap forming station; and (d) spray nozzles for spraying water mist to relieve bending stress in the formed cap.

5. Palletizing apparatus for placing a load of material on a pallet in one or more layers, and thereby creating a pallet load, with formed caps on at least two such layers, said palletizing apparatus comprising:

(a) a load forming station, said load forming station being adapted to receive a pallet and to receive material onto the pallet, the material having a length and a width and corresponding sides thereabout;

(b) transfer apparatus for placing material onto the pallet at said load forming station;

(c) placing apparatus for placing a first formable flat sheet on a first such layer in said load forming station, and a second formable flat sheet on a second layer, the second layer overlying the first formable flat sheet, each of such flat sheets comprising a main panel having a length and a width defining edges of the main panel, generally corresponding to the length and width and the corresponding sides of the material, edge panels extending from the main panel at the edges, and operative lines of bending weakness between the edge panels and the main panel; and (d) cap forming apparatus, including folding plows, for folding edge panels of the first flat side, and to fold edge panels of the second flat sheet while holding edge panels of the first sheet so folded.

6. Palletizing apparatus as in claim 5 and including spray nozzles for spraying water mist to relieve bending stress in the formed cap.

7. Palletizing apparatus for placing a load of material on a pallet in one or more layers, and thereby creating a pallet load with a formed cap on at least one such layer, said palletizing apparatus comprising:

(a) a load forming station, for receiving a pallet and for receiving material onto such pallet, wherein such material has a length and a width and corresponding sides thereabout;

(b) transfer apparatus for placing material onto such pallet at said load forming station;

(c) apparatus for placing a formable flat sheet on such material in said load forming station, the flat sheet comprising a main panel, edge panels extending from the main panel, and lines of bending weakness between the edge panels and the main panel;

(d) cap forming apparatus, including folding plows, for folding edge panels of such flat sheet along said sides of the such material after such flat sheet has been placed on such material; and (e) wrapping apparatus adapted to stretch wrap the pallet load and thereby to restrain such edge panels of such cap in substantial restraining contact with the corresponding said sides of such material, said cap forming apparatus and said stretch wrapping apparatus being combined, and thereby being comprised in a single consolidation station of said palletizing apparatus for consolidating the load, wherein edge panels of such cap are folded by said folding plows and the pallet load is stretch wrapped after such edge panels are folded, said consolidation station including (f) a controller for controlling withdrawal of said folding plows whereby as the pallet load is stretch wrapped, portions of said folding plows are withdrawn from under the advancing stretching wrap material.

8. Palletizing apparatus as in claim 7 and including apparatus for rotating the pallet load and said folding plows with respect to said stretch wrapping apparatus.

9. Palletizing apparatus as in claim 7, said portions of said folding plows under the advancing stretch wrap material having one or more distal fingers thereof disposed close enough to such cap while stretch wrap material is being applied to the pallet load and being appropriately configured, such that said distal fingers can be withdrawn from under the applied stretch wrap material without damaging the stretch wrap material.

10. Palletizing apparatus as in claim 9, said consolidation station comprising supports supporting said folding plows, said folding plows being mounted to said supports, and including a control for advancing said plows (i) vertically and (ii) inwardly toward the sides of such material at an angle displaced from the vertical, while folding the edge panels against the sides of the material.

11. A palletizer for placing a load of material on a pallet in one or more layers, and thereby creating a pallet load, with a formed cap on at least one such layer, said palletizer comprising:

(a) a load forming station, for receiving a pallet and for receiving material onto the pallet;

(b) transfer apparatus for placing material onto the pallet at said load forming station;

(c) cap forming and placing apparatus, said cap forming and placing apparatus comprising a lifting apparatus and folding plows, said lifting apparatus being adapted (i) to lift a formable flat sheet from a stack of such sheets and to pass such flat sheet through said folding plows to thereby fold such flat sheet into a folded disposition to thereby create a formed cap at a first work station, the formed cap having a main panel, with edges thereabout, and edge panels folded about said edges, and depending from said edges, (ii) to more such cap so-formed from said first work station, to a position over the material on the pallet, and (iii) to pl ace such so-formed cap on material on the pallet; and (d) spray nozzles to dispense liquid mist onto the edges while the edge panels are held in the folded disposition by said folding plows, to thereby relieve folding stress in such cap.

12. A palletizer as in claim 11 and including a forming mandrel adapted to be placed on the opposite side of the flat sheet from said lifting head, and to push on said flat sheet, opposite said lifting head, and thereby to cause movement of said main panel as said flat sheet is passed through said folding plows and folded thereby.

13. A method of forming a pallet load in a palletizer, with material in one or more layers, and thereby creating a pallet load with a formed cap on at least one such layer, said palletizer having a load forming station, and transfer apparatus for placing material on a pallet in said load forming station, said method comprising the steps of:

(a) placing one or more units of material on a pallet in said load forming station in a layer, said layer having a length and a width and corresponding sides;

(b) forming and placing a cap on such material in said load forming station, such cap entering said palletizer as a formable flat sheet, and departing said palletizer on a pallet load as a formed cap on such material, said forming and placing comprising (i) forming said flat sheet into a cap without said flat sheet contacting said material, said flat sheet comprising a main panel having a length and a width defining edges of said main panel, said length and said width, and said edges of said main panel generally corresponding to said length and width and said corresponding sides of said layer, edge panels extending from said main panel at said edges thereof, and operative lines of bending weakness between said edge panels and said main panel, and (ii) placing said cap on said material, said forming and placing including folding said edge panels into a predominantly perpendicular orientation with respect to said main panel, thereby forming said flat sheet into a formed cap, and (c) subsequently placing said formed cap on said layer.

14. A method as in claim 13 and including relieving folding stress in said cap after said folding of said edge panels.

15. A method of forming a pallet load in a palletizer, with material in one or more layers, and thereby creating a pallet load with a formed cap on at least one such layer, said palletizer having a load forming station, and transfer apparatus for placing material on a pallet in said load forming station, said method comprising the steps of:

(a) placing one or more units of material on a pallet in said load forming station in a layer, said layer having a length and a width and corresponding sides; and (b) forming and placing a cap on such material in said load forming station, said cap entering said palletizer as a formable flat sheet, and departing said palletizer on a pallet load as a formed cap on such material, said forming and placing comprising (i) forming said flat sheet into a cap without said flat sheet contacting said material, said flat sheet comprising a main panel having a length and a width defining edges of said main panel, said length and said width, and said edges of said main panel generally corresponding to said length and width and said corresponding sides of said layer, edge panels extending from said main panel at said edges thereof, and operative lines of bending weakness between said edge panels and said main panel, and (ii) placing said cap on said material, said placing and forming including placing said flat sheet on said layer at a first work station, with said edge panels of said flat sheet extending outwardly from said sides of said layer, and subsequently folding said edge panels of said flat sheet, and removing the so-formed cap from said first work station and placing said so-formed cap on the material at a second work station, separate from said first work station.

16. A method as in claim 15 and including relieving folding stress in said cap after said folding of said edge panels.

17. A method of forming a pallet load in a palletizer, with material in one or more layers, and thereby creating a pallet load with a formed cap on at least one such layer, said palletizer having a load forming station, and transfer apparatus for placing material on a pallet in said load forming station, said method comprising the steps of:

(a) placing one or more units of material on a pallet in said load forming station in a layer, said layer having a length and a width and corresponding sides;

(b) forming and placing a cap on such material in said load forming station, such cap entering said palletizer as a formable flat sheet, and departing said palletizer on a pallet load as a formed cap on such material, said forming and placing comprising (i) forming said flat sheet into a cap without said flat sheet contacting said material, said flat sheet comprising a main panel having a length and a width defining edges of said main panel, said length and said width, and said edges of said main panel generally corresponding to said length and width and said corresponding sides of said layer, edges panels extending from said main panel at said edges thereof, and operative lines of bending weakness between said edge panels and said main panel, and (ii) placing said cap on said material; and (c) relieving folding stress in said cap after said folding of said edge panels.

18. A method of forming a pallet load in a palletizer with material in one or more layers, and thereby creating a pallet load with a formed cap on at least one such layer, said palletizer having a load forming station, and transfer apparatus for placing on a pallet in said load forming station, said method comprising the steps of:

(a) placing one or ore units of material on a pallet in said load forming station in a layer, said layer having a length and a width and corresponding sides thereabout;

(b) placing a formable flat sheet on said layer in said load forming station, said flat sheet comprising a main panel having a length and a width defining edges of said main panel, said length and said width, and said edges, of said main panel generally corresponding to said length and said width and the corresponding said sides of said layer, edge panels extending from said main panel at said edges, and operative lines of bending weakness between said edge panels and said main panel;

(c) urging folding plows against said edge panels and thereby folding said edge panels of said flat sheet against said sides of said layer; and (d) stretch wrapping said pallet load and thereby restraining said edge panels of said cap in substantial restraining contact wit the corresponding said sides of said layer, said step of folding of said edge panels and said step of stretch wrapping between performing on said pallet load at a consolidation station, said consolidation station being adapted for both said folding step and said stretch wrapping step, and including (e) withdrawing said folding plows from between the advancing stretch wrap material and the sides of the corresponding layer as said stretch wrap material is advanced on said pallet load.

19. A method as in claim 18, and including in said folding step, advancing said folding plows simultaneously (i) vertically and (ii) inwardly toward said sides of said layer, such that said plows advance toward said sides at an angle oblique to the vertical.

20. A method as in claim 18 and including rotating said pallet load and said folding plows as a unit, with respect to said stretch wrapping apparatus during said stretch wrapping step.

21. A method of forming a pallet load in a palletizer with material in one or more layers, and thereby creating a pallet load with a formed cap on at least one such layer, said palletizer having a load forming station and transfer apparatus for placing material on a pallet in said load forming station, said method comprising the steps of:
 (a) placing one or more units of material on a pellet in said load forming station in a layer, said layer having a length and a width and corresponding sides thereabout;
 (b) forming a formable flat sheet into a cap by passing a said flat sheet through folding plows to thereby form said flat sheet into a folded disposition to thereby create a formed cap, without said flat sheet contacting said material, said formed cap having a main panel, with edges thereabout, and edge panels folded and dependent therefrom;
 (c) placing said so-formed cap on said layer of material; and
 (d) dispensing liquid mist onto said edges of said main panel of said sheet while said edge panels are held in said folded disposition by said folding plows, and thereby relieving folding stress in said cap.

22. A method as in claim 21, said forming of said flat sheet comprising temporarily securing a lifting head to said flat sheet, and while said lifting head id temporarily secured to said flat sheet, pushing on a surface of said flat sheet and thereby moving the main panel of said flat sheet as said flat sheet is passed through said folding plows and folded thereby.

23. A method of forming a pallet load in a palletizer with material in one or more layers, and thereby creating a pallet load with a formed cap on at least one such layer, said palletizer having a load forming station and transfer apparatus for placing material on a pallet in said load forming station, said method comprising the steps of:
 (a) placing one or more units of material on a pallet in said load forming station in a layer, said layer having a length and a width and corresponding sides thereabout;
 (b) forming a formable flat sheet into a cap by passing a said flat sheet through folding plows to thereby form said flat sheet into a folded disposition to thereby create a formed cap, without said flat sheet contacting said material, said formed cap having a main panel, with edges thereabout, and edge panels folded and dependent therefrom, said forming of said flat sheet comprising temporarily securing a lifting head to said flat sheet, and while said lifting head is temporarily secured to said flat sheet, pushing on a surface of said flat sheet and thereby moving the main panel f said flat sheet as said flat sheet is passed through said folding plows and folded thereby;
 (c) placing said so-formed cap on said layer of material; and
 (d) dispensing steam onto said edges of said main panel of said sheet while said edge panels are held in said folded disposition by said folding plows, and thereby relieving folding stress in said cap.

24. A method as in claim 23, said forming of said flat sheet comprising temporarily securing a lifting head to said flat sheet, and while said lifting head is temporarily secured to said flat sheet, pushing on a surface of said flat sheet and thereby moving the main panel of said flat sheet as said flat sheet is passed through said folding plows and folded thereby.

25. A method of forming a pallet load in a palletizer with material in one or more layers, and thereby creating a pallet load with a formed cap on at least one such layer, said palletizer having a load forming station and transfer apparatus for placing material on a pallet in said load forming station, said method comprising the steps of:
 (a) placing one or more units of material on a pallet in said load forming station in a layer, said layer having a length and a width and corresponding sides thereabout;
 (b) forming a formable flat sheet into a cap by passing a said flat sheet through folding plows to thereby form said flat sheet into a folded disposition to thereby create a formed cap, without said flat sheet contacting said material, said formed cap having a main panel, with edges thereabout, and edge panels folded and dependent therefrom; and
 (c) placing said so-formed on said layer of material; and
 (d) selecting, as said flat sheet, a sheet having a zone of reduced bending resistance, along a path generally defined by at least two adjacent said edges of said main panel and extending transverse to said path a distance sufficient to allow forming of said flat sheet for emplacement, as a formed cap, on layers having, in combination, length and width variations of up to about 15%.

26. Palletizing apparatus for placing a load of material on a pallet in one or more layers, and thereby creating a pallet load with a formed cap on at least one such layer, said palletizing apparatus comprising:
 (a) a load station for receiving a pallet and for receiving material onto the pallet in a layer, wherein such material has a length and a width, and corresponding sides thereabout;
 (b) transfer apparatus for placing material onto the pallet at said load forming station; and
 (c) forming apparatus for forming a foldable flat sheet into a cap on such material in said load forming station, said forming apparatus comprising folding plows for folding edge panels of such foldable flat sheet and including a guides for advancing said plows (i) vertically and (ii) inwardly toward such sides of such material at an oblique angle displaced from the vertical, while folding such edge panels against such sides of such material.

27. A method of forming a pallet load in a palletizer, with material, in one or more layers, and thereby creating a pallet load with a formed cap on at least one such layer, said palletizer having a load forming station and transfer apparatus for placing material on a pallet in said load forming station, said method comprising the steps of:
 (a) placing one or more units of material on a pallet in said load forming station in a layer, said layer having a length and a width and corresponding sides; and (b) forming a foldable flat sheet into a cap on said material in said load forming station, by advancing folding plows (i) vertically and (ii) inwardly toward said sides of said layer at an angle displaced from the vertical, while folding edge panels of said foldable flat sheet against said sides of said layer.

28. A method as in claim 27, and including stretch wrapping said pallet load and, at the same time, withdrawing said folding plows from between the advancing stretch material and the sides of the corresponding layer.

29. A method of forming a pallet load in a palletizer, with material, in one or more layers, and thereby creating a pallet load with a formed cap on at least one such layer, such palletizer having a load forming station, and transfer apparatus for placing, on a pallet, in said load forming station, a layer of material comprising an array of units of material, said method comprising the steps of:

(a) placing an array of units of material on a pallet in said load forming station, said array comprising a layer of said units of material, said layer having a length, a width, and corresponding sides thereabout; and (b) covering said layer, over substantially the entirety of said length and said width of said layer, with a single cap by
  (i) placing a flat formable sheet on said layer,
  (ii) folding edge panels of said formable sheet to a folded position against said sides of said layer by advancing folding plows simultaneously (I) vertically and (II) inwardly toward said sides of said layer, such that said plows advance toward said sides at an angle oblique to the vertical, whereby said edge panels confine said units therebetween and said units of material are urged to mutually support each other, and
  (iii) restraining said edges panels in said folded position.

* * * * *